US011884486B2

(12) United States Patent
McNeilus et al.

(10) Patent No.: US 11,884,486 B2
(45) Date of Patent: Jan. 30, 2024

(54) ROBUST GRABBER ARM FOR REFUSE COLLECTION VEHICLE

(71) Applicant: Con-Tech Manufacturing, Inc., Dodge Center, MN (US)

(72) Inventors: Grant McNeilus, Dodge Center, MN (US); Garwin McNeilus, Dodge Center, MN (US); Brian Meldahl, Dodge Center, MN (US)

(73) Assignee: Con-Tech Manufacturing, Inc., Dodge Center, MN (US)

( * ) Notice: Subject to any disclaimer, the term of this patent is extended or adjusted under 35 U.S.C. 154(b) by 0 days.

(21) Appl. No.: 17/656,725

(22) Filed: Mar. 28, 2022

(65) Prior Publication Data

US 2023/0086945 A1 Mar. 23, 2023

Related U.S. Application Data

(60) Provisional application No. 63/261,367, filed on Sep. 20, 2021.

(51) Int. Cl.
*B65F 3/04* (2006.01)
*B65F 3/02* (2006.01)

(52) U.S. Cl.
CPC ........ *B65F 3/041* (2013.01); *B65F 2003/023* (2013.01); *B65F 2003/0263* (2013.01)

(58) Field of Classification Search
CPC .......... B65F 3/041; B65F 3/043; B65F 3/045; B65F 3/046
See application file for complete search history.

(56) References Cited

U.S. PATENT DOCUMENTS

| | | | | | |
|---|---|---|---|---|---|
| 5,613,822 | A * | 3/1997 | Gasparini | B65F 3/048 414/303 |
| 5,720,589 | A | 2/1998 | Christenson et al. | |
| 5,772,385 | A * | 6/1998 | Huntoon | B65F 3/043 414/420 |
| 5,833,429 | A | 11/1998 | McNeilus et al. | |
| 5,988,970 | A * | 11/1999 | Holtom | B65F 3/048 414/733 |
| 6,474,928 | B1 * | 11/2002 | Christenson | B65F 3/046 414/408 |
| 6,494,665 | B1 | 12/2002 | Bingman | |
| 6,722,839 | B2 | 4/2004 | Bingman | |
| 9,403,641 | B1 | 8/2016 | Ghibaudo | |
| 9,598,235 | B2 | 3/2017 | Vasilescu et al. | |
| 9,834,377 | B1 | 12/2017 | Hayes et al. | |
| 10,221,012 | B2 | 3/2019 | Hund | |

(Continued)

FOREIGN PATENT DOCUMENTS

WO 96/28369 9/1996

*Primary Examiner* — Jonathan Snelting
(74) *Attorney, Agent, or Firm* — Craig J. Lervick; Larkin Hoffman Daly & Lindgren, Ltd.

(57) ABSTRACT

A robust grabber arm for use as part of a refuse collection vehicle has an inner arm member and an outer arm member which are designed to have parallel beams coupled to one another so that a wide operating profile is created. Further, care is taken in configuring compounds so that each of the hinge points and coupling points are accessible for service and maintenance purposes. To provide additional consistency, common bearings and hinge pins are used throughout, so that maintenance and possible replacement can be easily achieved.

20 Claims, 14 Drawing Sheets

(56) References Cited

U.S. PATENT DOCUMENTS

| | | | |
|---|---|---|---|
| 10,899,538 | B2 | 1/2021 | Nelson et al. |
| 10,994,929 | B2 | 5/2021 | Haddick et al. |
| 11,001,440 | B2 | 5/2021 | Rocholl et al. |
| 2003/0077156 | A1 | 4/2003 | Bingman |
| 2016/0159571 | A1 | 6/2016 | Arrez |
| 2017/0291765 | A1 | 10/2017 | Kouri |
| 2017/0297818 | A1 | 10/2017 | Goedken et al. |
| 2020/0262328 | A1 | 8/2020 | Nelson et al. |
| 2020/0346856 | A1 | 11/2020 | Rocholl et al. |
| 2020/0346859 | A1 | 11/2020 | Buege et al. |
| 2020/0346860 | A1 | 11/2020 | Buege et al. |

* cited by examiner

ROBUST GRABBER ARM FOR REFUSE COLLECTION VEHICLE

BACKGROUND

Side load refuse collection trucks are widely used in today's society and can be seen operating in many cities, towns and rural areas. These refuse collection trucks include a grabber arm that is located on the curb side of a vehicle, allowing an operator to simply position the vehicle next to refuse containers, and use the grabber arm to retrieve and dump the contents into a refuse collection hopper. While convenient, the grabber arm is a complex device, which typically includes several moving parts and requires maintenance at several locations, including hinge points, connection points, and hydraulic actuators. Although many such systems exist, the durability and maintainability of these mechanisms is a primary concern. Each particular component of the grabber arm can be subjected to severe stresses, especially when the grabber arm is being extended a considerable distance, and is required to carry significant loads. In addition, since the grabber arm is being continuously used throughout any particular operating day and goes through many grabbing cycles, each of the wear points (bearings, pins, bushings, etc.) is subject to considerable wear. Also, refuse collection trucks operate in all types of conditions, often including dirty, muddy, cold, or harsh environments. As such, it is desirable to create a grabber arm that is robust, easily serviceable, and capable of efficiently operating in these conditions.

As mentioned above, serviceability and maintenance of the grabber arm is a primary concern. In many current systems, multiple arm components are coordinating with one another, and access to service points is not always convenient. Typically, such systems are designed in a space saving format, resulting in parts/components being nested with one another, and thus concealing many components. In addition, the type of maintenance required is often unpredictable and varied, thus the ability to remove and/or replace parts is important. This is particularly true for pins, bearings and coupling components. As such, knowledge of known wear points, and consideration of accessibility is a significant concern, and one that has not always been considered in the past.

SUMMARY

By carefully designing each component of a side load grabber arm with service and maintenance in mind, a grabber system is achieved which is robust, serviceable, efficient, and effective. The grabber arm generally comprises a mounting bracket (which is attachable to a portion of the refuse collection truck), an inner arm, an outer arm, and a grabber mechanism. The inner arm and outer arm are both designed to have two parallel frame members connected by at least one central cross piece. Although using two parallel frame members or beam members necessarily requires the use of additional structures and components, including additional hinge points, bushings, hinge pins and bearings, the resulting structure provides a wider stance, which is very rigid and stable. In addition, each of the hinge points can be positioned or oriented so that they are easily accessible for service purposes. Further, common components, such as common bearings and pins, are utilized throughout the robust grabber arm thus making replacement and service easy and convenience. The grabber mechanism itself is also carefully designed to be driven by a minimum number of hydraulic actuators and thus provides a consistent, repeatable, and robust grabbing motion, which is capable of efficiently handling refuse collection bins.

BRIEF DESCRIPTION OF THE DRAWINGS

Further details of the various embodiments will be apparent from following description, in conjunction with the drawings, in which.

DESCRIPTION

The following detailed description outlines certain features, advantages and characteristics of one embodiment of a robust grabber arm 10 for use as a component of a refuse collection vehicle 16. Although various references throughout the following detailed description are made to "inner," "outer," "upper," "lower," "front," "back," "first," "second," and other relative terms, it will be understood that these references are relative and are not to be construed as limiting. Additionally, various components can be substituted, replaced or may be identified differently at times throughout this detailed description.

Figure 1:
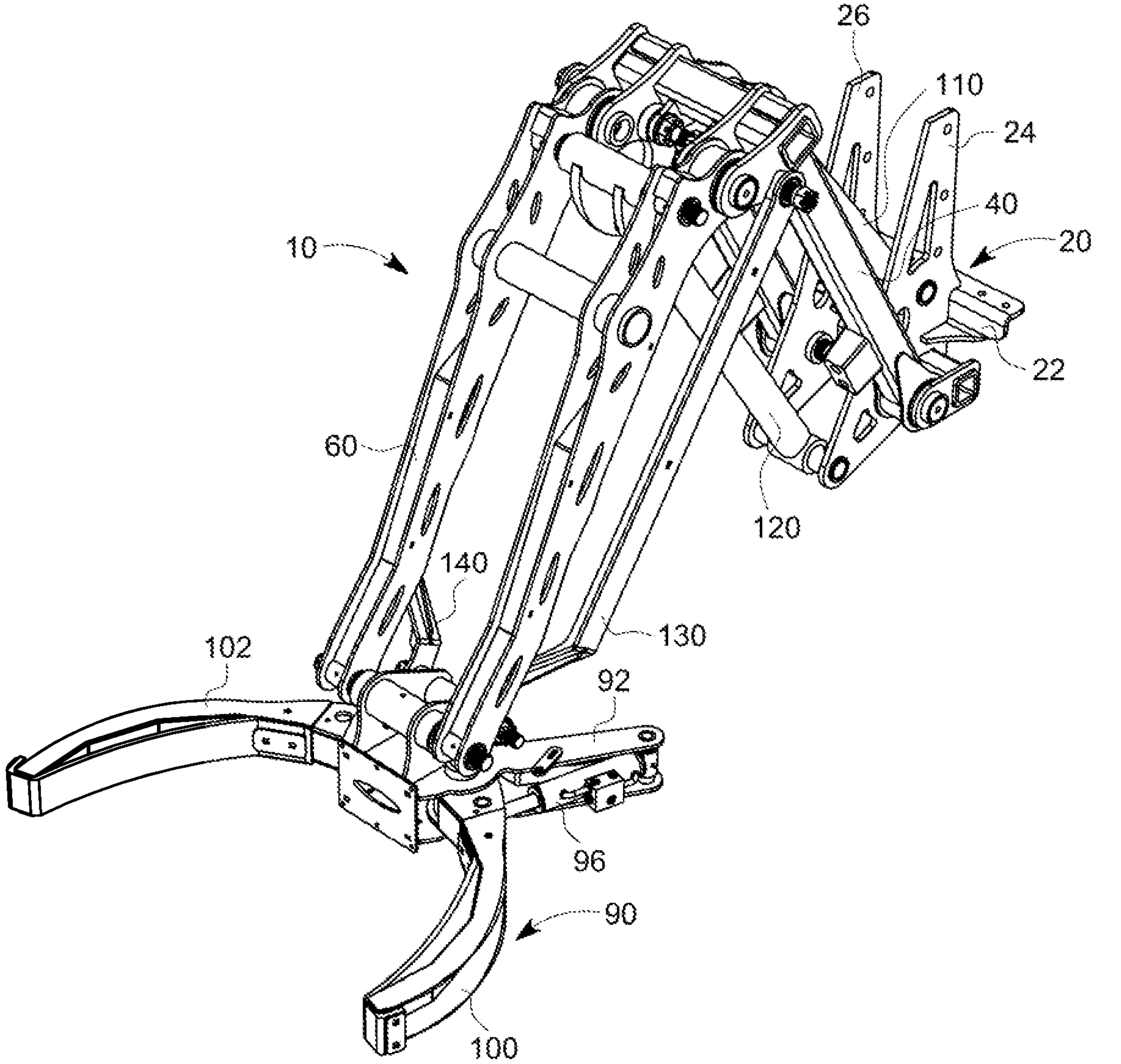
FIG. 1 is a perspective view of an embodiment of the robust grabber arm.

Turning now to FIG. 1, a perspective view of robust grabber arm 10 is illustrated. As shown, robust grabber arm 10 is in a partially extended position and a related refuse collection vehicle 16 is not shown. As will be discussed in further detail below, when in use robust grabber arm 10 is attached to refuse collection vehicle 16, it is continuously movable between three primary positions, including a stowed position, a reach (or extended) position, and a dump position.

Generally, robust grabber arm 10 comprises a mounting bracket 20, which is uniquely configured for attachment to refuse collection vehicle 16. Robust grabber arm 10 further comprises an inner arm 40, which is hingedly connected to mounting bracket 20, an outer arm 60, which is hingedly attached to inner arm 40, and a grabber mechanism 90. Robust grabber arm 10 further includes various components to help control movements and maintain desired alignments. These components generally comprise a first drive cylinder 110, a second drive cylinder 120, a first alignment link 130 and a second alignment link 140. As will be appreciated, both first drive cylinder 110 and second drive cylinder 120 are hydraulic cylinders which are coupled to hydraulic valves and related components used to control movement. First alignment link 130 and second alignment link 140 are coupled between inner arm 40 and grabber mechanism 90 to maintain desired alignment during operation. In addition, a first central coupling link 150 and a second central coupling link 160 are rotatably attached to outer arm 60 and inner arm 40, respectively. In this particular embodiment, first coupling link 150 and second coupling link 160 are used to provide an intermediate connection point for one end of second drive cylinder 120.

As suggested above, grabber mechanism 90 is coupled to an outer end of outer arm 60. In this embodiment, grabber mechanism 90 generally includes a main grabber bracket 92 utilized to support and accommodate operation of grabber arms 100 and 102. A third drive cylinder 96 (or grabber cylinder 96) is part of grabber mechanism 90, and is utilized to create appropriate movement of grabber arms 100 and 102. As will be further discussed below, grabber arms 100 and 102 are both rotatably coupled to grabber bracket 92, and include an internally meshed gear structure 106 to ensure that these two components consistently move in conjunction with one another. Although pins or bearings rotatably coupling first grabber arm 100 and second grabber arm 102 to grabber bracket 92 are accessible, gear structure 106 is hidden or generally shielded by grabber bracket 92.

Figure 12:
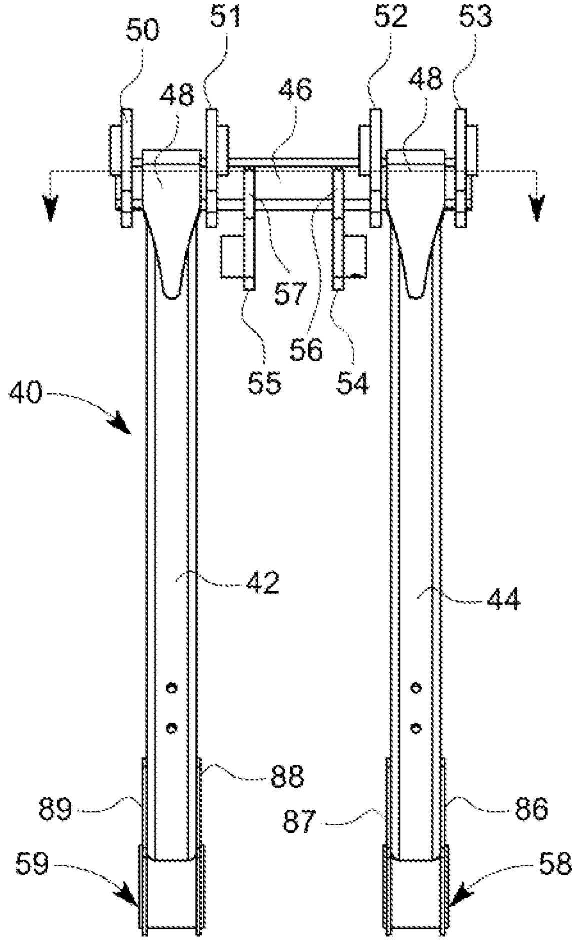
FIG. 12 is a front view of an inner arm.

In the disclosed embodiment, inner arm 40 and outer arm 60 are specifically designed to form a robust mechanical structure, while also allowing for easy serviceability of components. Referring to FIG. 12, a front view of inner arm 40 is presented. As shown, inner arm 40 includes a first inner arm beam member 42 and a second inner arm beam member 44 which are generally parallel with one another. At an upper end of both first inner arm beam member 42 and second inner arm beam member 44, a coupling tube 46 connects these two beam members to one another. In this embodiment coupling tube 46 is a rectangular tube element. Similarly, first inner arm beam member 42 and second inner arm beam member 44 are rectangular tube elements, each formed of ⅜-inch steel. As will be appreciated, each of these components provide considerable strength and durability.

Figure 13:
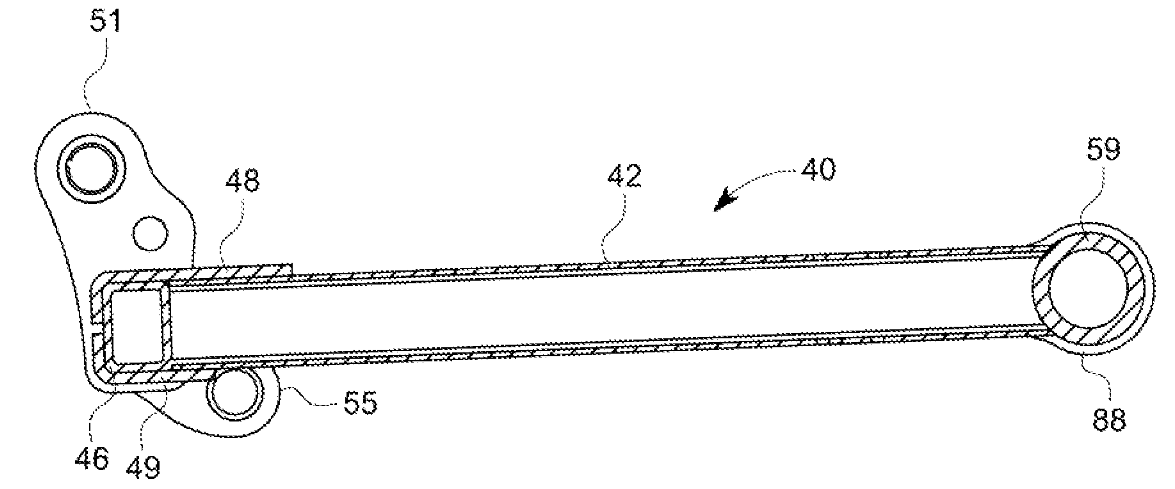
FIG. 13 is a first cross-sectional view of the inner arm.
Figure 14:
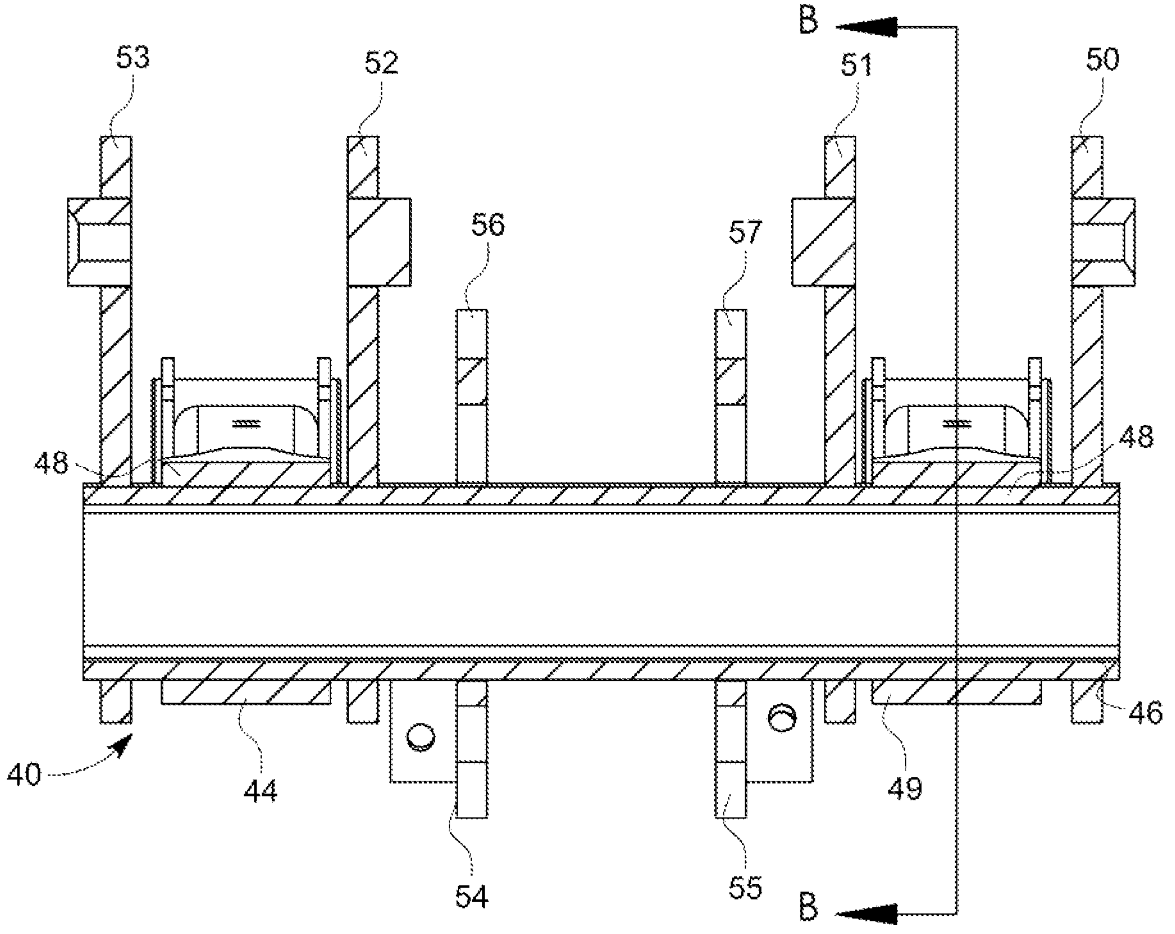
FIG. 14 is a second cross-sectional view of the inner arm.

To illustrate additional details, FIG. 13 provides a first cross-sectional view of inner arm member 40, while FIG. 14 provides a second cross-sectional view. More specifically, FIG. 14 provides a cross-sectional view along section lines D-D, as shown in FIG. 12. In a similar manner, FIG. 13 provides a cross-sectional view along the section indicator B-B as shown in FIG. 14. To provide additional strength and assist in coupling first inner arm beam member 42 and second inner arm beam member 44 to coupling tube 46, a coupling plate 48 surrounds these elements on one side. A similar coupling plate 49 is utilized on an opposite side. Also attached to coupling tube 46 are a number of attachment ears 50-53. As will be discussed in further detail below, each of these attachment ears 50-53 accommodate the attachment of additional components to inner arm 40. In addition, inner arm 40 includes rear attachment flanges 54 and 55 in addition to central attachment flanges 56 and 57. All of these features contribute to the unique capabilities and robust characteristics of first inner arm beam member 42 and second inner arm beam member 44.

At a second end of first inner arm beam member 42 and second inner arm beam member 44, a second attachment structure exists. In this particular embodiment, a number of flanges 86, 87, 88 and 89 are attached to first inner arm beam member 42 and second inner arm beam member 44 in a manner to accommodate and support bushings 58 and 59.

Figure 9:
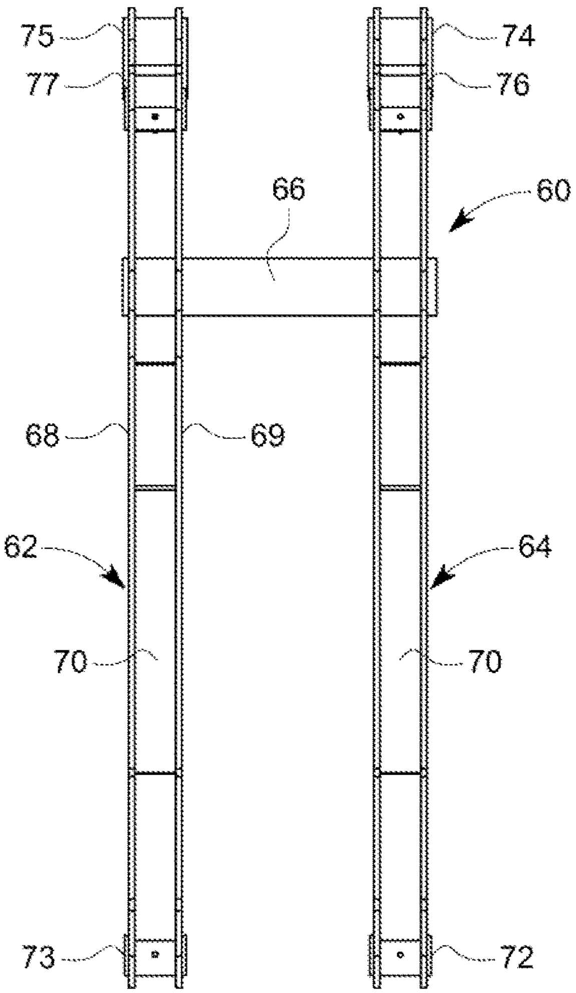
FIG. 9 is a front view of an outer arm.
Figure 10:
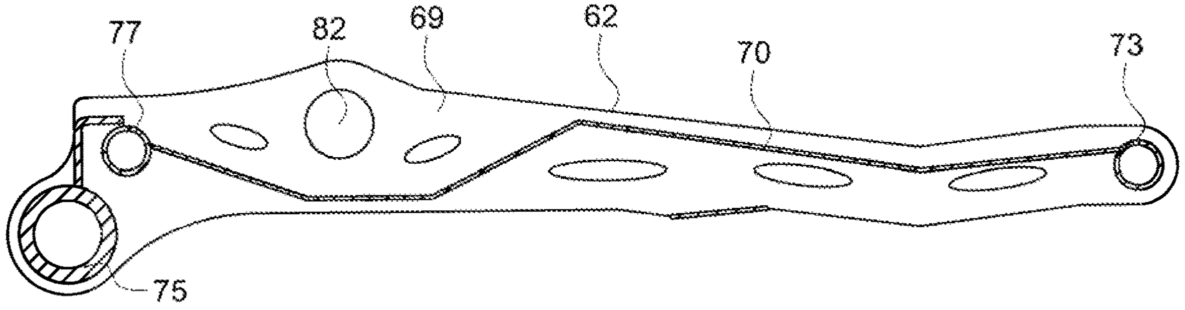
FIG. 10 is a first cross-sectional view of the outer arm.
Figure 11:
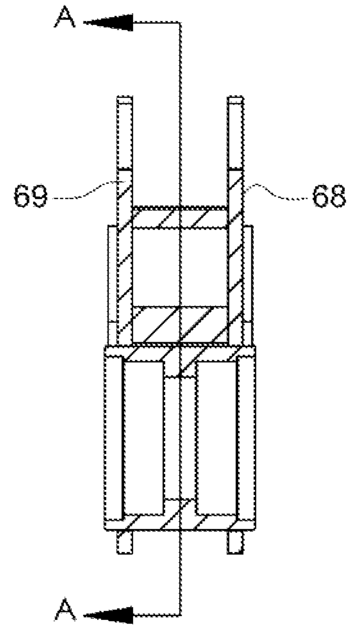
FIG. 11 is a second cross-sectional view of the outer arm.

Turning now to FIGS. 9-11, similar detail regarding outer arm 60 is shown. More specifically, FIG. 9 illustrates a front view of outer arm 60, which includes a first outer arm I-beam member 62 and a second outer arm I-beam member 64. As illustrated, a first outer arm I-beam member 62 and second outer are I-beam member 64 are substantially parallel with one another and are configured similarly to provide similar levels of strength and durability throughout. FIG. 10 and FIG. 11 illustrate cross-sectional views of first outer arm I-beam member 62 and show additional detail. Connected between first outer arm I-beam member 62 and second outer arm I-beam member 64 is a coupling tube 66, which is centrally located and extends substantially perpendicular to each of the I-beam members. In FIG. 10 and FIG. 11, only first outer I-beam member 62 is illustrated, however, it is understood that second outer arm I-beam member 64 will be configured in the same way.

As best illustrated in FIGS. 9 and 11, first outer arm I-beam member 62 is configured to have parallel wall members 68 and 69. These wall members are connected to one another using a central cross member 70 which is uniquely configured and designed to provide support and strength.

As illustrated in FIG. 9, a bottom portion of outer arm 60 supports a first outer arm bearing 72 and second lower outer arm bearing 73. At an upper end, a set of primary bearing supports 74, 75 are provided, along with alignment bearing supports 76 and 77. As will be discussed in further detail below, these structures are provided to support the rotatable coupling of other components to outer arm 60. As further illustrated, each of both first outer arm I-beam member 62 and second outer arm I-beam member 64 include a number of relief openings 80 and have an attachment opening 82 configured to receive central coupling tube 66. These features and the unique design of first outer arm beam member 62 and second outer arm beam member 64 provide a component that is well suited to perform the necessary function, while also being very robust. Further, this provides appropriate separation from other components and easy access to service points. FIG. 10 also illustrates how cross member plate 70 is uniquely shaped to traverse the entire length of first outer I-beam member 62 and is configured to provide strength to desired areas.

Figure 2:
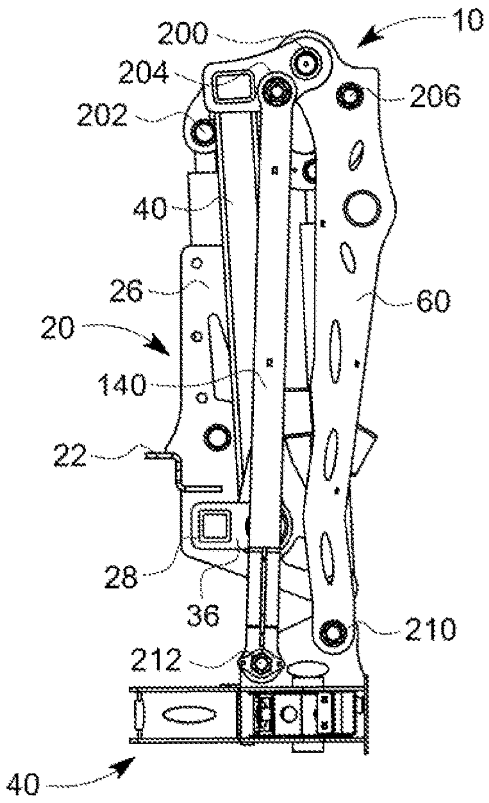
FIG. 2 is a side view of the robust grabber arm while in the stowed position.
Figure 3:
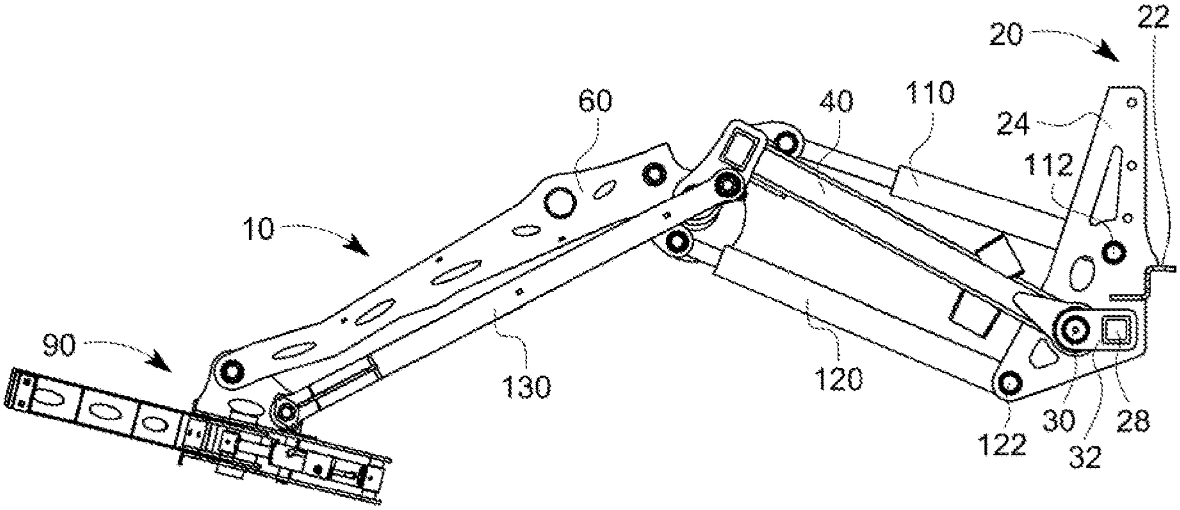
FIG. 3 is a side view of the robust grabber arm while in the extend/pick-up position.
Figure 4:
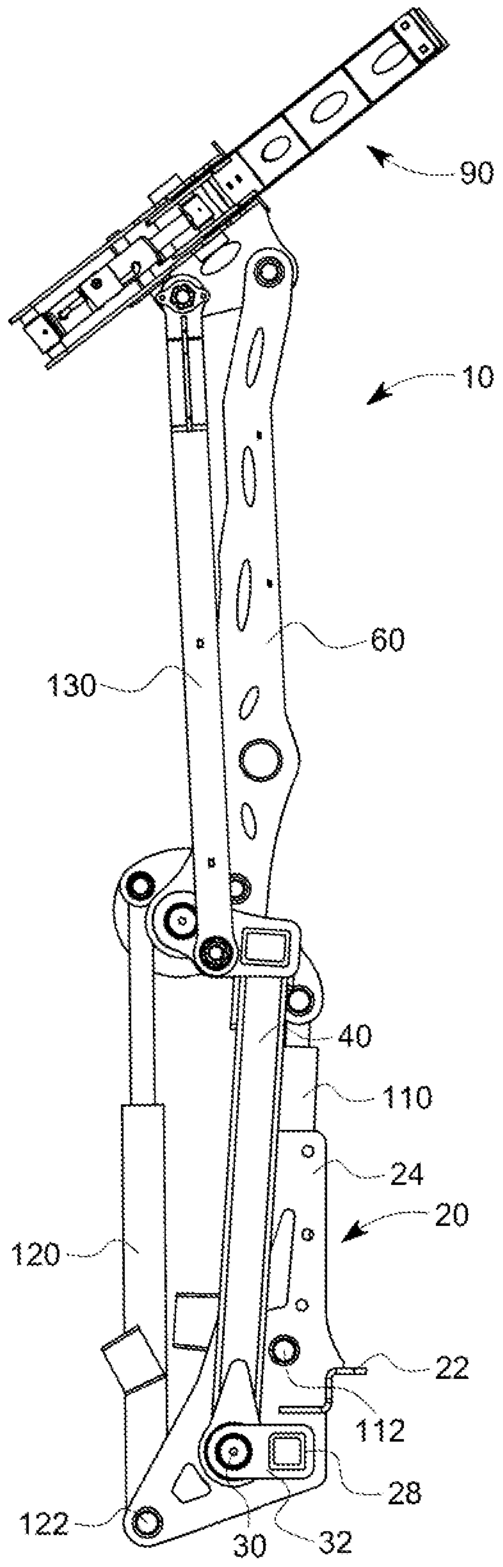
FIG. 4 is a side view of the robust grabber arm while in the dumping position.

As generally discussed above, robust grabber arm 10 is configured to be movable between three primary positions when mounted to a refuse collection vehicle 16. Referring now to FIGS. 2-4, these three positions are better illustrated, along with showing the orientation of compounds during operation. As shown when in a stowed position (FIG. 2), the components of robust grabber arm 10 are positioned to be substantially upright so they can be stowed adjacent to refuse collection truck 16, so as to avoid interference while traveling to collection locations. While in the reach position (FIG. 3), robust grabber arm 10 is configured so it is able to grab refuse containers (not shown) by operating grabber mechanism 90. Similarly, while in the dump position (FIG. 4), robust grabber arm 10 is moved so that grabber mechanism has been raised and tilted, thus allowing any contents within a carried refuse container to be dumped into a collection hopper carried by the refuse collection vehicle 16.

Again, robust grabber arm 10 includes mounting bracket 20 configured to be securely mounted to the frame, body or other supporting structure of refuse collection vehicle 16. In this embodiment, mounting bracket 20 includes a horizontal support 22, a first upright plate 24 and a second upright plate 26. Horizontal support 22 is configured to extend between first upright plate 24 and second upright plate 26 to provide rigidity thereto. In addition, a rectangular coupling tube 28 helps to provide further rigidity, and helps to support other necessary connections. Most significantly, rectangular coupling tube 28 helps to provide further support for an inner arm coupling pin 30. This additional support is achieved by utilizing a surrounding plate 32 which is securely connected to rectangular coupling tube 28. A similar second surrounding plate 36 and second inner arm coupling pin 34 exists on an opposite side of mounting bracket 20. As will be further discussed below, this provides a secure and robust connection structure allowing inner arm member 40 to be rotatably coupled to mounting bracket 20. In addition, mounting bracket 20 further accommodates a first drive cylinder connecting pin 112 and a second drive cylinder connecting pin 122, which are used to couple respective portions of first drive member 110 and second drive member 120.

Figure 16:
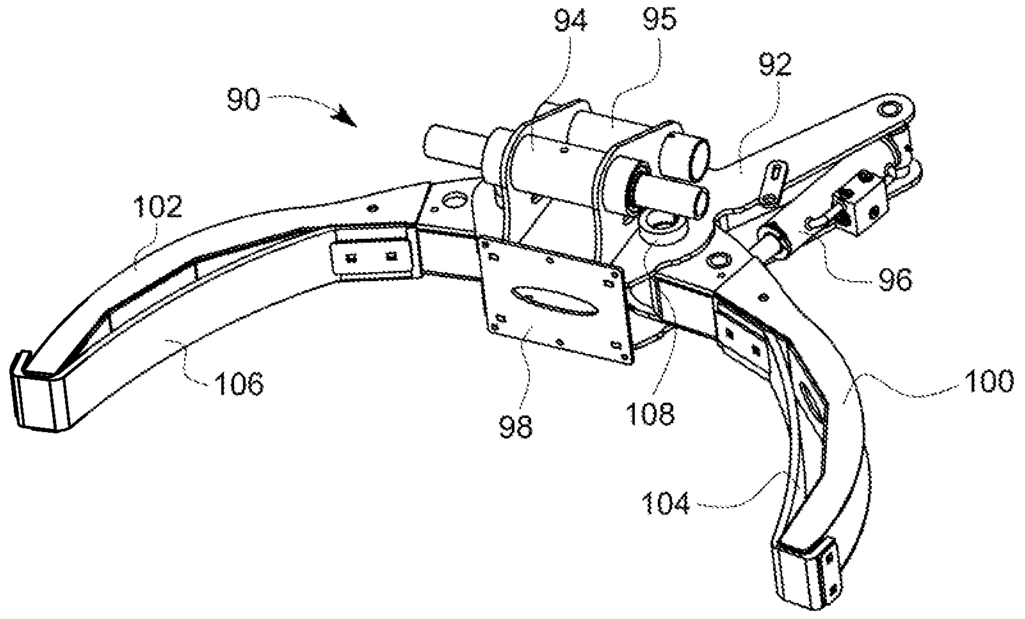
FIG. 16 is a perspective view of the grabber mechanism.

As generally mentioned above, robust grabber arm 10 includes a grabber mechanism 90 which is uniquely configured to retrieve and dump refuse containers. A detailed perspective view of grabber mechanism 90 is illustrated in FIG. 16. As shown, grabber mechanism 90 includes grabber bracket 92, drive mechanism 96, first grabber arm 100 and second grabber arm 102. To accommodate connection to other components, and specifically connection to outer arm 60, first alignment link 130 and second alignment link 140, grabber bracket 92 includes a primary bushing 94 and a secondary bushing 95. Both primary bushing 94 and secondary bushing 95 are configured to receive and support related connecting pins. In addition, grabber mechanism 90 includes a front plate 98 which can function as a main contact point when retrieving refuse containers. Front plate 98 may also be configured to support and accommodate the operation of various sensors such a sonar or proximity sensors of various types (not shown).

In the illustrated embodiment, first grabber arm 100 has a first resilient member 104 attached thereto, while second grabber arm 102 also includes a second resilient member 106 attached thereto. In this embodiment, first resilient member 104 and second resilient member 106 are rubber coated fabric strips that can conform to and grab refuse containers. As will be appreciated, each of these components help to grab and contain the refuse container when the grabber arms are moved to surround the outer walls of the refuse container. In operation, drive cylinder 96 will direct movement of first grabber arm 100 and second grabber arm 102. As seen, first grabber arm 100 is connected to grabber bracket 92 at a hinge point 108. A similar hinge point 109 exists to support second grabber arm 102.

Figure 17:
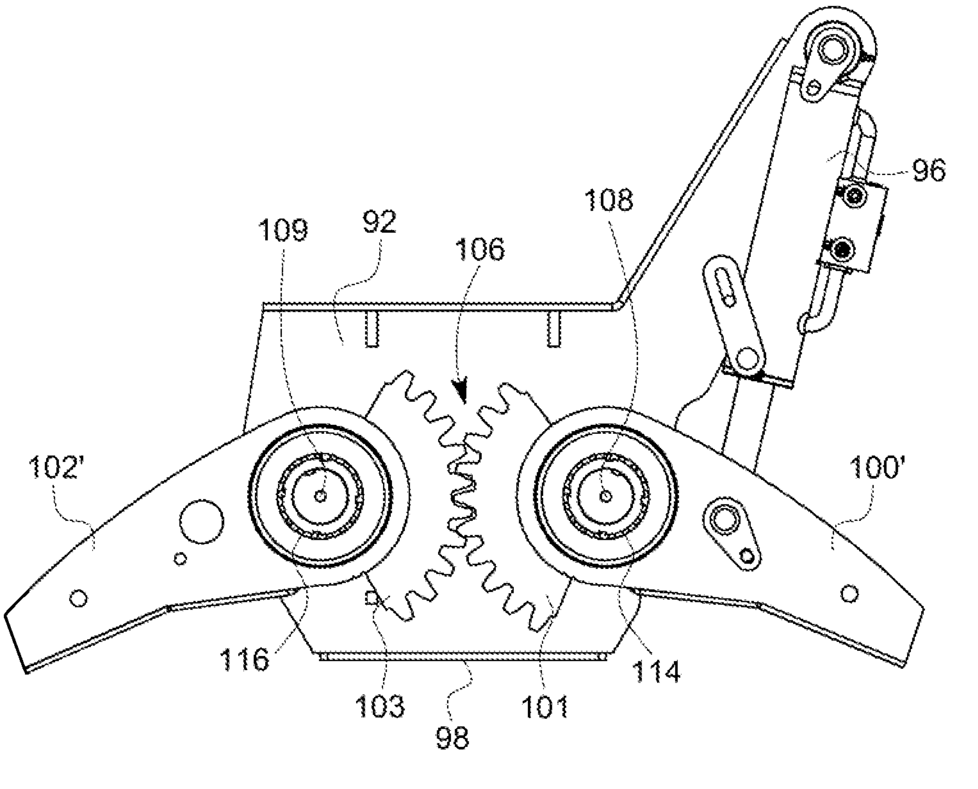
FIG. 17 is a view of first and second grabber arms which form a portion of grabber mechanism.

As better shown in FIG. 17, a gear mechanism 106 is included as an integral portion of first grabber arm 100 and second grabber arm 102, which will cause these two elements to move in unison with one another. The operation of drive mechanism 96 will easily create the desired grabbing motion for first grabber arm 100 and second grabber arm 102. More specifically, FIG. 17 illustrates a first portion 100' of first grabber arm 100, which is rotatably coupled to grabber bracket 92 via a bearing 114 (here, first portion 100' is configured to support an extension to form first grabber arm 100). Similarly, a first portion 102' of second grabber arm 102 is shown as being rotatably coupled to grabber bracket 92 via a bearing 116. Again, operation of drive mechanism 96 will cause rotation of first grabber arm 100 about hinge point 108 and rotation of second grabber arm 102 about hinge point 109. In this embodiment, first portion 100' of first grabber arm 100 has a gear extension 101, while first portion 102' of second grabber arm 102 has a related gear extension 103, with gear extensions 101, 103 meshing with one another to cause coordinated movement.

Figure 5:
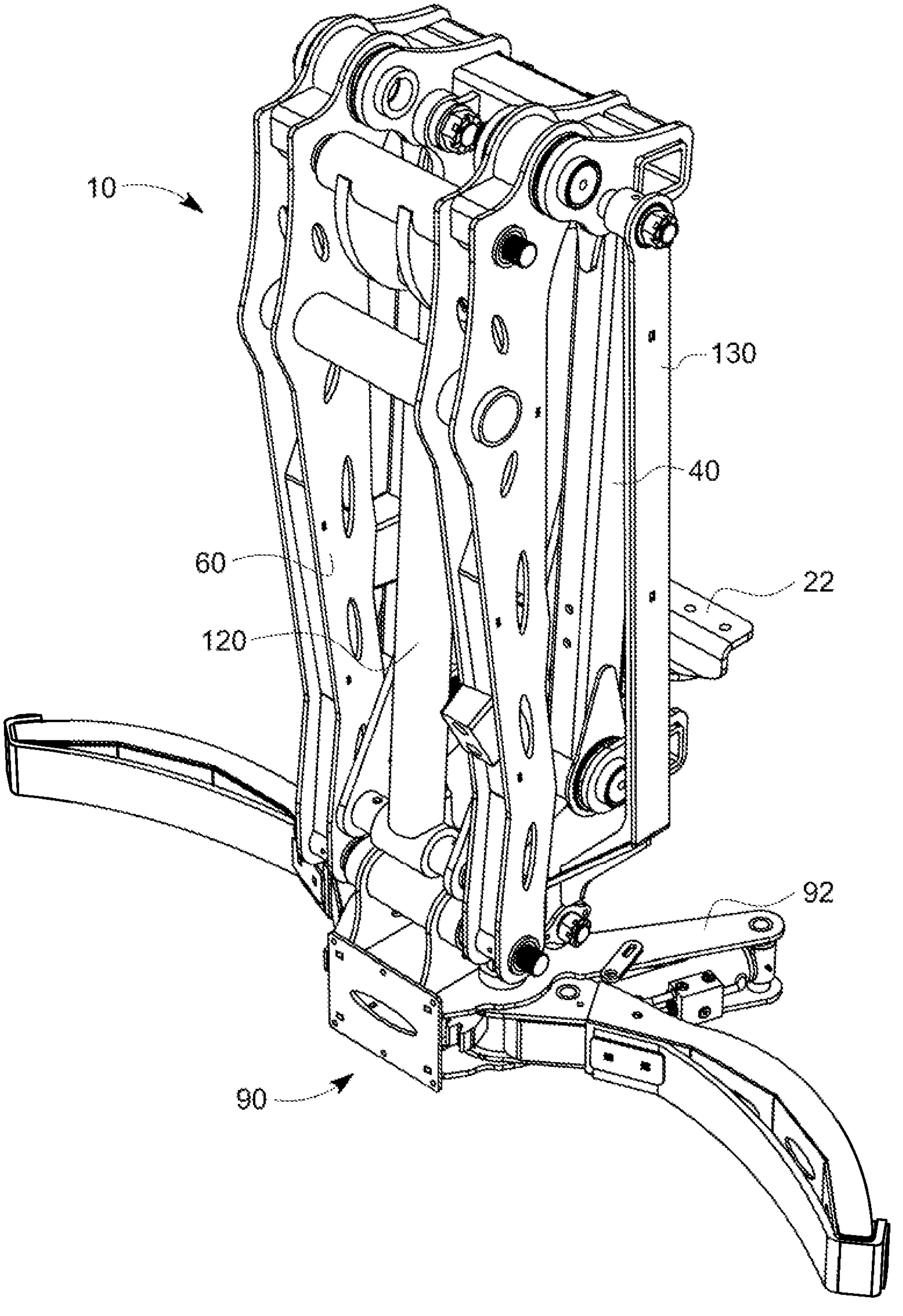
FIG. 5 is a perspective view of the robust grabber arm in the stowed position.

Referring again to FIGS. 1, 5 and 6, robust grabber arm 10 also includes first alignment link 130 and second alignment link 140. As indicated, each of these elements are coupled at a first end to inner arm 40, and at a second end to grabber bracket 92. Based upon the positioning and configuration of these elements and their relationship with other components, these elements will assist to maintain alignment of grabber mechanism 90 during various stages of operation. The inclusion of first alignment link 130 and second alignment link 140 eliminates the need for additional drive mechanisms to control the positioning of grabber mechanism 90.

Again, robust grabber arm 10 includes first coupling link 150 and second coupling link 160 which are also uniquely configured to assist in the controlled movement of grabber mechanism 90. As shown, first coupling link 150 has a central pin 152, and a pair of connecting tabs 154 and 156. First coupling link 150 is a unitary element, with coupling tabs 154 and 156 rigidly connected to a main body 151.

Figure 6:
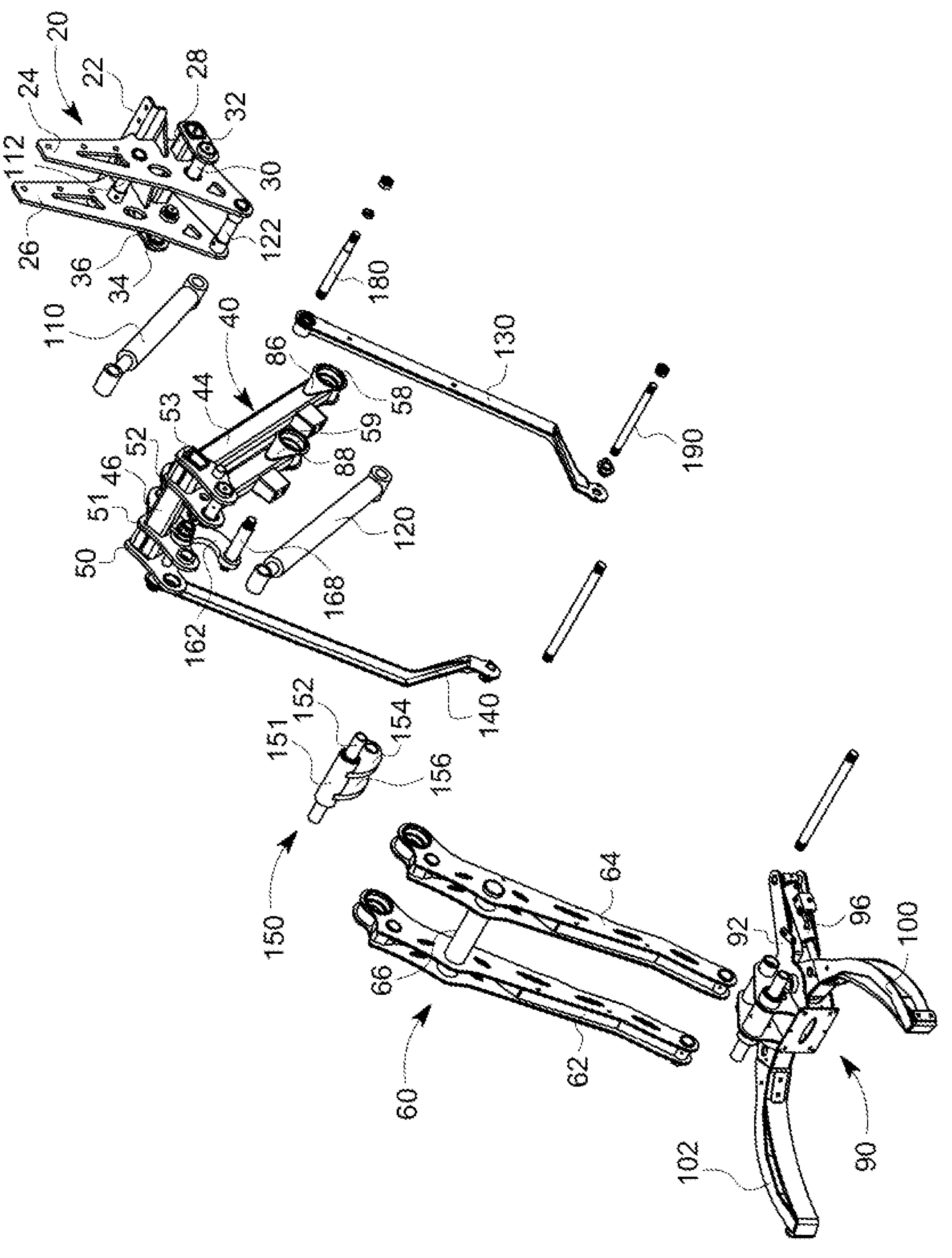
FIG. 6 is an exploded view of several components making up the robust grabber arm.
Figure 7:
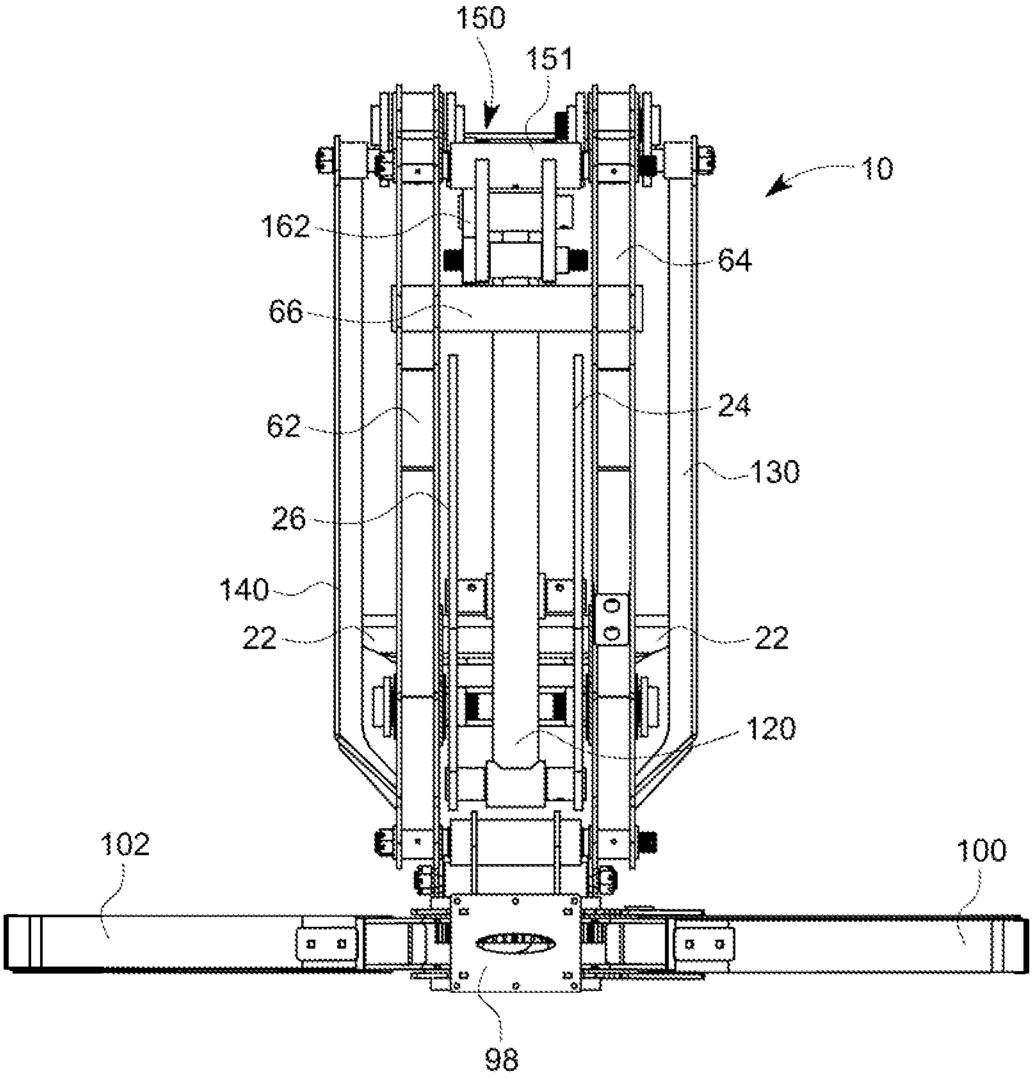
FIG. 7 is a front view of robust grabber.
Figure 8:
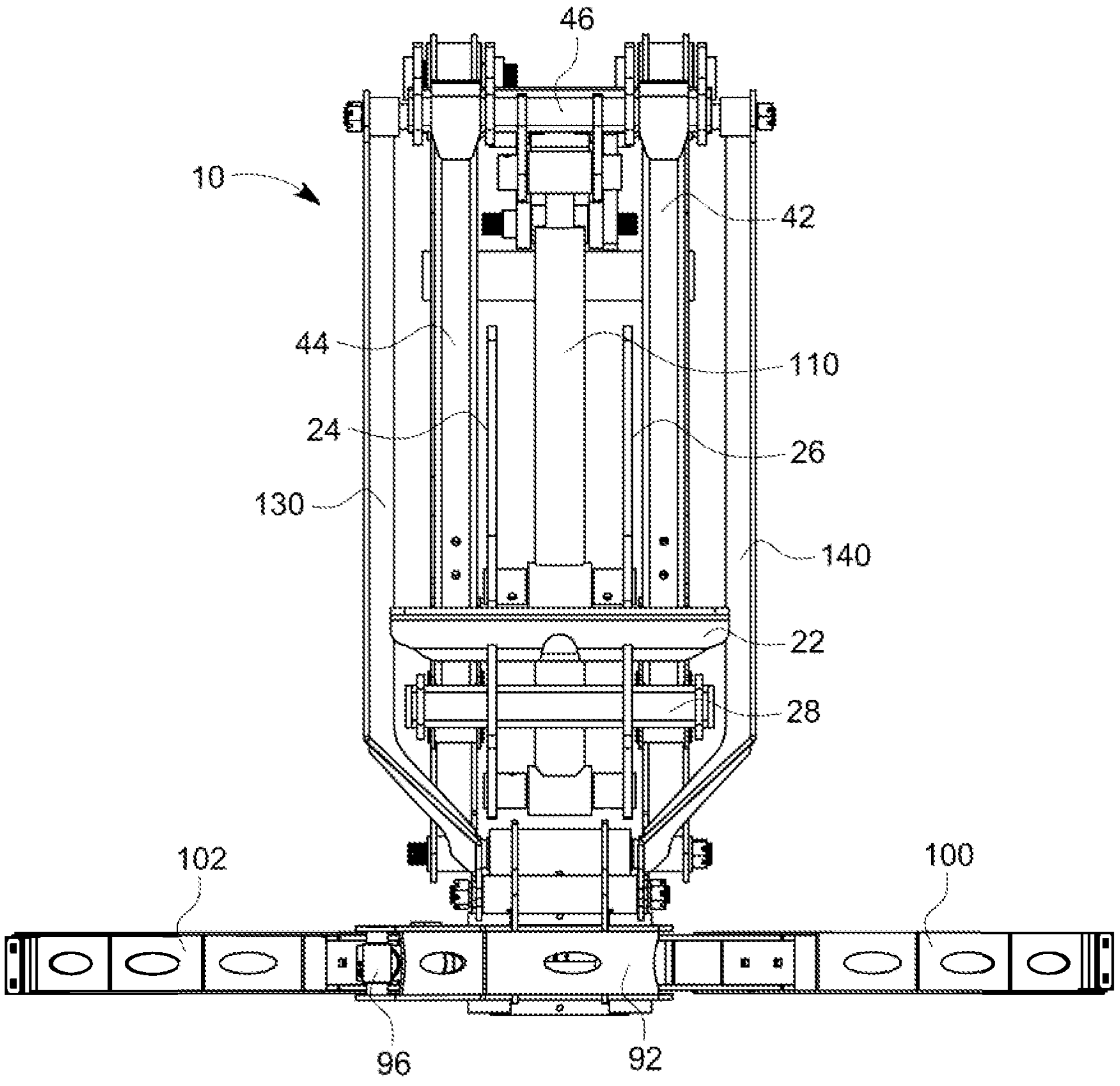
FIG. 8 is a rear view of the robust grabber.

Second coupling link 160 comprises a first coupling plate 162 and a second coupling plate 164. These coupling plates are configured to support connection to first coupling link 150 via a connection pin 168. As shown in FIG. 6, second coupling plate 164 is not present, to allow a better viewing of pin 168. Pin 168 is aligned and configured to moveably couple first coupling link 150, second coupling link 160 and second drive cylinder 120 at a central portion of robust grabber 10.

Figure 15:
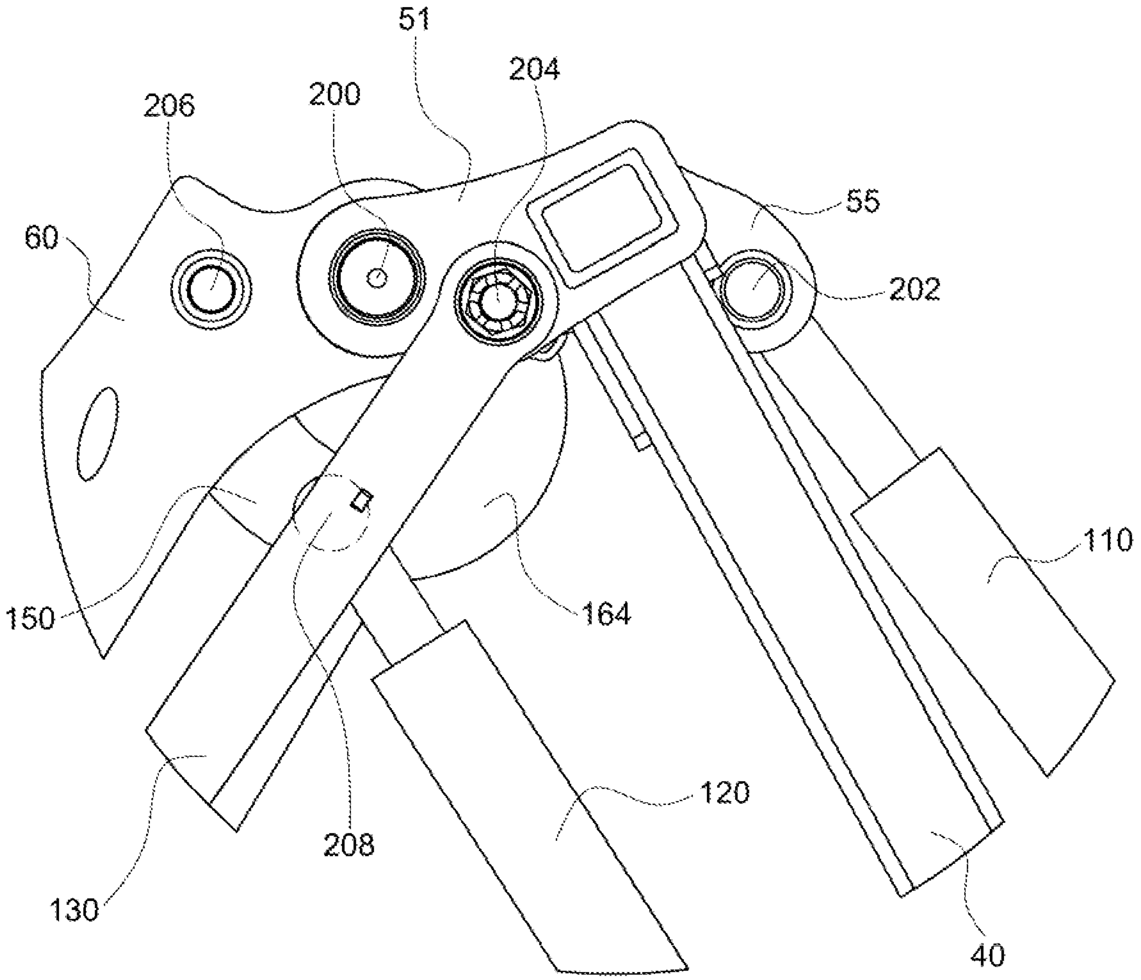
FIG. 15 is a close-up view of the central hinge point connecting the inner arm with the outer arm.

To better understand the connection of various elements, especially at the central hinge point of robust grabber arm, FIG. 15 provides a partial closeup view of this area. As illustrated, inner arm 40 and outer arm 60 are connected to one another at a central hinge point 200. First cylinder or first drive mechanism 110 is coupled to rear flange 55 of inner arm 40, while first alignment link 130 is also connected to inner arm member 40 at an alignment coupling point 204. Second coupling plate 164 of coupling link 160 is also coupled to inner arm member 40 at the same coupling point 204. First coupling link 150 is similarly coupled to outer arm member 60 at coupling point 206. Lastly, second drive mechanism or cylinder 120 is coupled to a pin 168 at a coupling point 208. As will be appreciated, each of the identified coupling points provide for rotatable coupling, and thus allow for a specific controlled movement.

In the disclosed embodiments, special care is taken to utilize commonly sized connecting pins and heavy duty bearings throughout. As one example, heavy duty 2-inch bearings are used at several locations, such as the central point 200, the grabber arm hinge points 108, and the main connection point between mounting bracket 20 and inner arm 40. In addition, easy change links and pins are utilized at other locations. As an example of this design approach, FIG. 6 illustrates a plurality of easy change pins 180, 182 which are selected to be common sizes. In this manner, service is simplified by allowing for common parts. Similar commonality is achieved by utilizing common sizes for bearings and bushings.

As will be apparent from the drawings, each of the service locations are easily accessible, which will allow for removal and/or maintenance of bearings, links and pins, as necessary. The arrangement of service locations and various components is best illustrated in FIGS. 2-4, which present side views of robust grabber arm 10 in various positions. While in the stored position, hinge points 200, 202, 204 and 206 are all easily accessible for service operations. In addition, grabber hinge points 210 and 212 are also accessible from the side. In addition, when moved to an intermediate position, slightly away from refuse collection vehicle 16 (i.e. in the position shown in FIG. 1), pins 112 and 122 (used for connection to housing bracket 20) are also easily accessible. Based upon this configuration, it will be fairly straightforward for service personnel to access these positions, and replace or service any pins or bearings needing attention.

Figure 18A:
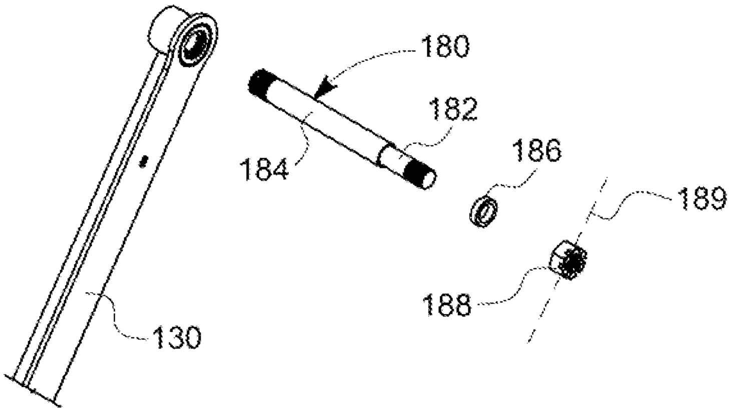
FIG. 18A and FIG. 18B are partial perspective views showing the bearings and easy change links and pins used throughout the robust grabber arm.
Figure 18B:
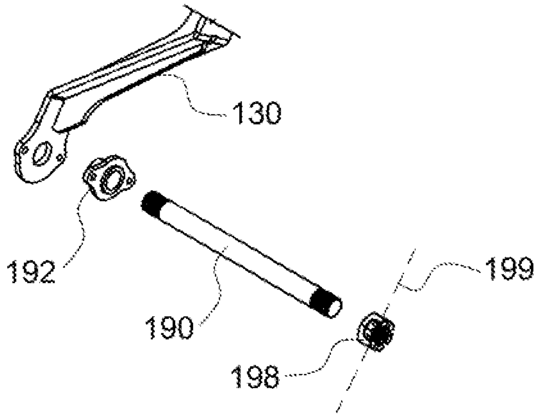

As previously mentioned, robust grabber 10 makes use of common sized easy change pins wherever possible. FIGS. 18A &18B illustrate examples of these components. FIG. 18A presents a perspective view of a first pin 180, which in this embodiment is used to couple first alignment link 130 with inner arm 40. In this embodiment, first pin 180 is threaded at both ends, and has a stepped diameter. A lower stepped portion 182 is configured to support and cooperate with a bearing 186, while a larger portion 184 is configured to interact with an internal bushing within inner arm 40. A slotted nut 188 is configured to thread onto a threaded end of first pin 180, and a related locking pin 189 is used to lock the slotted nut 188 in place. Threaded end of first pin 180 has a hole configured to receive a locking pin 189, and slots provided in slotted nut 188 will be aligned to contain locking pin 189. As will be appreciated, this structure allows first pin 180 to be securely held in place, but also easily replaceable.

In a similar manner, FIG. 18B shows second pin 190, which is used to couple first alignment link 130 with grabber bracket 92. Here, second pin 190 is threaded at both ends, and is configured to cooperate with a lower bearing 192, which will be attached to a lower end of first alignment link 130. Again, a slotted nut 198 is used to hold second pin 190 in place. A locking pin 199 is again used to hold slotted nut 198 in place, configured to be inserted into a hole in second pin 190, an be positioned within a slot of slotted nut 198.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A robust grabber arm attachable to a refuse collection vehicle, comprising:

an inner arm having a first end and a second end, wherein the first end is rotatably coupled to the refuse collection vehicle and rotatable about a first axis, the inner arm comprising a pair of substantially parallel inner arm beam members situated substantially perpendicular to the first axis and at least one inner arm cross member permanently adjoining and extending between the pair of inner arm beam members to thus provide rigidity to the inner arm;

an outer arm having a first end and a second end, wherein the first end of the outer arm is rotatably coupled to the second end of the inner arm along a second axis, wherein the first axis and the second axis are substantially parallel with one another, the outer arm comprising a pair of substantially parallel outer arm beam members separated from one another and at least one outer arm cross member permanently adjoining each of the pair of outer arm beam members to thus provide rigidity to the outer arm, the at least one outer arm cross member being positioned at a predetermined location between the first end and the second end of the outer arm, wherein the predetermined location of the at least one outer arm cross member is not aligned with either the first axis or the second axis;

a grabber mechanism coupled to the second end of the outer arm, the grabber mechanism configured to grab a refuse container;

an alignment link coupled to the inner arm and the grabber mechanism;

a first drive mechanism coupled to the refuse collection vehicle and the inner arm member, wherein driving the first drive mechanism causes rotation of the inner arm about the first axis; and a second drive mechanism coupled to the refuse collection vehicle and the outer arm member, wherein driving the second drive mechanism will cause rotation about the second axis.

2. The robust grabber arm of claim 1 wherein the inner arm and first drive mechanism are rotatably coupled to the refuse collection vehicle via a supporting bracket which is affixed to a frame member of the refuse collection vehicle at coupled to a predetermined location.

3. The robust grabber arm of claim 2 wherein the inner arm beam members are box beams, and the at least one inner arm cross member is a box beam coupled proximate the second end of the inner arm and is substantially perpendicular to each of the substantially parallel inner arm beam members, and wherein each of the pair of outer arm beam members are I-beams comprising a pair of upright walls and a cross wall extending between the upright walls, and wherein the at least one outer beam cross member is a tube extending between the I-beams and is connected to each of the upright walls.

4. The robust grabber arm of claim 3 wherein the second axis is positioned at a first predetermined location of the inner arm and the alignment link is coupled to one of the inner arm members at a second predetermined location, wherein the first location and the second location are adjacent one another and are accessible when the grabber arm is in a stowed position and when the grabber arm is in an extended position.

5. The robust grabber arm of claim 4 further comprising:

a pair of main link bearings positioned in line with the second axis coupling the inner arm and outer arm, and a drive link having a first connection portion rotatably coupled proximate the first end of the inner arm and at a second attachment portion rotatably coupled proximate the first end of the outer arm, with the first connection portion and the second connection portion coupled to one another at a central coupling point, and the second drive mechanism coupled to the drive link at the central coupling point, wherein each of the main link bearings and the rotatable coupling points are accessible from an outside portion of the grabber arm.

6. The robust grabber arm of claim 5 wherein the first end of the inner arm is coupled to the supporting bracket using a pair of bracket attachment bearings aligned with the first axis, wherein the pair of bracket attachment bearings and the pair of main link bearings are all configured to be substantially the same as one another.

7. The robust grabber arm of claim 6 wherein the grabber mechanism comprises:

a grabber bracket coupled to the second end of the outer arm and the alignment link;

a first grabber arm rotably coupled to the grabber bracket by a first grabber arm attachment bearing;

a second grabber rotably coupled to the grabber bracket by a second grabber arm attachment bearing and movably coupled to the first grabber arm; and a drive mechanism coupled to the grabber bracket and the first grabber arm such that actuation of the drive mechanism causes movement of the first grabber arm and the second grabber arm;

wherein the first grabber arm attachment bearing, the second grabber arm attachment bearing, the pair of bracket attachment bearings, and the pair of main link bearings are all configured to be substantially the same as one another.

8. The robust grabber arm of claim 7 wherein the alignment link is coupled to the grabber mechanism and the inner arm via a plurality of easy change pins.

9. The robust grabber of claim 4 wherein the inner arm parallel beam members and the inner arm cross member are aligned in an inner arm plane which contains the first axis, and wherein each of the inner arm beam members have a flange extending laterally away from the inner arm beam members at the second end in a direction which is not within the inner arm plane, and wherein the flanges are coupled to the outer arm thereby causing the second axis to be located parallel with but not within the inner arm plane.

10. The robust grabber of claim 1 wherein the alignment link is coupled to the grabber mechanism and the inner arm via a plurality of easy change pins.

11. The robust grabber of claim 1 wherein each of the pair of substantially parallel inner arm beam members are substantially linear and existing in an inner arm plane, and the inner arm further comprises a plurality of attachment ears configured to accommodate coupling to the outer arm, wherein the second axis is parallel to but not within the inner arm plane.

12. The robust grabber arm of claim 11 wherein the plurality of attachment ears are coupled to the inner arm cross member.

13. A robust grabber arm for attachment to a refuse collection vehicle at a predetermined position, the grabber arm comprising:

a mounting bracket configured to be coupled to a frame of the refuse collection vehicle and having a pair of uprights plates configured to accommodate mounting;

an inner arm having a pair of substantially parallel inner arm beam members spaced apart from one another, with each of the inner arm beam members having a first end rotatably coupled to a corresponding one of the pair of upright plates of the mounting bracket to allow rotation of the inner arm about a first axis which is perpendicular to the upright plates of the mounting bracket, the pair of substantially parallel inner arm beam members coupled to one another via an inner arm cross beam, wherein the inner arm cross beam member is permanently affixed to the pair of substantially parallel inner arm beam members at a location which is spaced away from the first end;

an outer arm having a pair of substantially parallel outer beam members spaced apart from one another while also being coupled via an outer arm cross member, each of the outer beam members rotatably coupled to a corresponding one of the inner beam members at a first end to allow rotation about a second axis, the outer arm cross member being permanently affixed to each of the pair of the substantially parallel outer beam members at a location which is spaced away from the first end of the outer arm beam members and not aligned with the first axis or the second axis;

a grabber mechanism having a grabber bracket coupled to a second end of the outer arm, and further having a pair of grabber arms coupled to the grabber bracket and configured to grab a refuse container;

a pair of alignment links, each having a first end coupled to the grabber mechanism and a second end coupled to one of the inner arm beam members;

a first drive mechanism coupled to the mounting bracket and the inner arm, wherein driving the first drive mechanism causes rotation of the inner arm about the first axis; and a second drive mechanism coupled to the mounting bracket and the outer arm, wherein driving the second drive mechanism will cause rotation about the second axis.

14. The robust grabber arm of claim 13 wherein the parallel inner arm beam members are box beams, and the inner arm cross member is a box beam coupled proximate to a second end of the parallel inner arm beam members and is substantially perpendicular to the inner arm beam members, and wherein each of the pair of substantially parallel outer arm beam members are I-beams comprising a pair of parallel walls and a cross wall extending between the pair of parallel walls, and wherein the outer arm cross member is a tube extending between the I-beams and is connected to each of the pair of parallel walls.

15. The robust grabber arm of claim 14 further comprising:

a pair of main link bearings positioned in line with the second axis coupling the inner arm and outer arm, and a drive link having a first connection portion rotatably coupled to the inner arm via a first link bearing at a first coupling location proximate a second end of the inner arm and at a second attachment portion rotatably coupled to the outer arm via a second link bearing at a second coupling location proximate the first end of the outer arm, with the second drive coupled to the drive link at a central portion thereof, wherein each of the main link bearings, the first link bearing and the second link bearing are accessible from an outside location of the grabber arm.

16. The robust grabber arm of claim 15 wherein the first end of the inner arm is coupled to the mounting bracket using a pair of bracket attachment bearings aligned with the first axis, wherein the pair of bracket attachment bearings and the pair of main link bearings are all configured to be substantially the same as one another.

17. The robust grabber of claim 16 wherein the inner arm beam members and the inner arm cross beam are aligned in an inner arm plane which contains the first axis, and wherein each of the inner arm beam members have a flange extending laterally away from the inner arm beam members at the second end thereof in a direction which is not within the inner arm plane, and wherein the flanges are coupled to the outer arm thereby causing the second axis to be located parallel with but not within the inner arm plane.

18. The robust grabber of claim 17 wherein the pair of alignment links are coupled to the grabber bracket and the inner arm beam members via a plurality of easy change pins.

19. The robust grabber of claim 13 wherein each of the pair of substantially parallel inner arm beam members are substantially linear and existing in an inner arm plane, and the inner arm further comprises a plurality of attachment ears configured to accommodate coupling to the outer arm, wherein the second axis is parallel to but not within the inner arm plane.

20. The robust grabber of claim 19 wherein the plurality of attachment ears are coupled to the inner arm cross member.

* * * * *